United States Patent
Chen et al.

(10) Patent No.: US 11,269,128 B2
(45) Date of Patent: Mar. 8, 2022

(54) MICROSTRUCTURE FOR DUAL VIEW DISPLAY AND OPTICAL FILM AND LIQUID CRYSTAL DISPLAY MODULE USING THE SAME

(71) Applicants: BOE TECHNOLOGY GROUP CO., LTD., Beijing (CN); Beijing BOE Optoelectronics Technology Co., Ltd., Beijing (CN)

(72) Inventors: Xiuyun Chen, Beijing (CN); Dae Keun Yoon, Beijing (KR)

(73) Assignees: BOE TECHNOLOGY GROUP CO., LTD., Beijing (CN); BEIJING BOE OPTOELECTRONICS TECHNOLOGY CO., LTD, Beijing (CN)

( * ) Notice: Subject to any disclaimer, the term of this patent is extended or adjusted under 35 U.S.C. 154(b) by 816 days.

(21) Appl. No.: 16/068,602

(22) PCT Filed: Sep. 21, 2017

(86) PCT No.: PCT/CN2017/102675
§ 371 (c)(1),
(2) Date: Jul. 6, 2018

(87) PCT Pub. No.: WO2018/157583
PCT Pub. Date: Sep. 7, 2018

(65) Prior Publication Data
US 2021/0165156 A1 Jun. 3, 2021

(30) Foreign Application Priority Data
Mar. 3, 2017 (CN) .......................... 201710124385.6

(51) Int. Cl.
*G02F 1/1335* (2006.01)
*F21V 8/00* (2006.01)

(52) U.S. Cl.
CPC ..... *G02B 6/0051* (2013.01); *G02F 1/133504* (2013.01)

(58) Field of Classification Search
CPC ......... G02F 1/133567; G02F 1/133606; G02F 1/133504; G02B 5/02; G02B 30/26; G02B 6/0051
See application file for complete search history.

(56) References Cited

U.S. PATENT DOCUMENTS

| 7,654,692 B2 | 2/2010 | Kitamura et al. |
| 9,217,815 B2 | 12/2015 | Zhao et al. |

(Continued)

FOREIGN PATENT DOCUMENTS

| CN | 102997133 A | 3/2013 |
| CN | 104482501 A | 4/2015 |

(Continued)

OTHER PUBLICATIONS

Search Report and Written Opinion for International Application No. PCT/CN2017/102675 dated Dec. 27, 2017.

*Primary Examiner* — Mariam Qureshi
(74) *Attorney, Agent, or Firm* — Calfee, Halter & Griswold LLP (57) ABSTRACT

The disclosure provides a microstructure for dual view display and an optical film and a liquid crystal display module using the same. The microstructure for dual view display includes a substrate; a left peak and a right peak formed on the substrate, wherein the left peak and the right peak exhibit right-and-left symmetry, the tip of the left peak is inclined in a direction away from the tip of the right peak relative to the bottom of the left peak, and the tip of the right peak is inclined in a direction away from the tip of the left peak relative to the bottom of the right peak, the left peak has a reflecting surface on a side of the tip of the left peak which is close to the right peak and a light-emerging surface on a (Continued)

side of the tip of left peak which is away from the right peak, and the right peak has a reflecting surface on a side of the tip of the right peak which is close to the left peak and a light-emerging surface on a side of the tip of right peak which is away from the left peak.

13 Claims, 10 Drawing Sheets

(56) References Cited

U.S. PATENT DOCUMENTS

| | | | |
|---|---|---|---|
| 9,709,712 B2 | 7/2017 | Zhao et al. | |
| 2008/0007950 A1 | 1/2008 | Kitamura et al. | |
| 2009/0279306 A1* | 11/2009 | Wang | F21V 7/00 |
| | | | 362/307 |
| 2011/0228387 A1* | 9/2011 | Shiau | G02B 5/045 |
| | | | 359/463 |
| 2012/0032930 A1 | 2/2012 | Li et al. | |
| 2012/0032931 A1 | 2/2012 | Li et al. | |
| 2014/0139777 A1* | 5/2014 | Zhao | G02B 6/0053 |
| | | | 349/57 |
| 2015/0226901 A1* | 8/2015 | Lee | G02B 6/0036 |
| | | | 362/607 |
| 2016/0061999 A1 | 3/2016 | Zhao et al. | |
| 2018/0348534 A1* | 12/2018 | Chen | G02B 30/27 |
| 2020/0057343 A1* | 2/2020 | Epstein | G02B 5/0231 |

FOREIGN PATENT DOCUMENTS

| | | | |
|---|---|---|---|
| EP | 2733527 A2 | 5/2014 | |
| EP | 2733527 A3 | 9/2014 | |

\* cited by examiner

MICROSTRUCTURE FOR DUAL VIEW DISPLAY AND OPTICAL FILM AND LIQUID CRYSTAL DISPLAY MODULE USING THE SAME

CROSS REFERENCE OF RELEVANT APPLICATIONS

This application is a National Phase Application of International Application PCT/CN2017/102675, with an international filing date of Sep. 21, 2017, which claims priority to Chinese Patent Application No. 201710124385.6, filed on Mar. 3, 2017, the contents of which are incorporated herein in their entirety by reference.

TECHNICAL FIELD

The disclosure relates to the field of display technology, and in particular, to a microstructure for dual view display and an optical film and a liquid crystal display module using the same.

BACKGROUND ART

A dual view display or dual view displaying mainly functions to display two-dimensional images from different angles, i.e., allowing the user to see different images from different angles. The dual view display can be mainly used in vehicle displays. For example, with a dual view display, each of passengers in different seats in a vehicle can see a different image from the same display, eliminating the need for providing an individual display for each passenger, saving the costs for display setup and reducing the space occupation within the vehicle.

The imaging mechanism of the dual view display mainly involves utilizing the shielding effect of a patterned shielding layer so that when a same pixel on the pixel layer is viewed from the left side and from the right side, the pixel cannot be seen from one side due to the blockage by the patterned shielding layer. Accordingly, different images can be seen from the left side and from the right side, so as to achieve the dual view effect.

It should be noted that the information provided above in the background section is provided only for better understanding of the background of the disclosure and therefore may contain information that does not form the prior art that is already known by those ordinary skilled in the art.

SUMMARY OF THE INVENTION

An object of the disclosure is to provide a microstructure for dual view display and an optical film and a liquid crystal display module using the same.

Other features and advantages of the disclosure will be apparent from the following detailed description, or may be learned, in part, by the practice of the disclosure.

According to a first aspect of the disclosure, it is provided a microstructure for a liquid crystal display backlight, comprising:

a substrate; and a left peak and a right peak formed on the substrate, wherein:

the left peak and the right peak exhibit right-and-left symmetry, the tip of the left peak is inclined in a direction away from the tip of the right peak relative to the bottom of the left peak, and the tip of the right peak is inclined in a direction away from the tip of the left peak relative to the bottom of the right peak, the left peak has a reflecting surface on a side of the tip of the left peak which is close to the right peak and a light-emerging surface on a side of the tip of the left peak which is away from the right peak, and the right peak has a reflecting surface on a side of the tip of the right peak which is close to the left peak and a light-emerging surface on a side of the tip of the right peak which is away from the left peak.

In an exemplary embodiment of the disclosure, a parallel light perpendicular to the substrate is incident on the left peak and the right peak, and the parallel light keeps parallel after being reflected by the reflecting surface.

In an exemplary embodiment of the disclosure, a parallel light perpendicular to the substrate is incident on the left peak and the right peak, and the parallel light keeps parallel after exiting from the light-emerging surface.

In an exemplary embodiment of the disclosure, the angle between the light finally exiting from the light-emerging surface and the incident light ranges from 20 to 60 degrees.

In an exemplary embodiment of the disclosure, the substrate is made of polyethylene terephthalate.

In an exemplary embodiment of the disclosure, the substrate has a thickness of 150-210 µm.

In an exemplary embodiment of the disclosure, the left peak and the right peak are made of polyethylene terephthalate or acrylic.

In an exemplary embodiment of the disclosure, the reflecting surface is formed by coating a reflecting layer.

In an exemplary embodiment of the disclosure, each of the left peak and the right peak has a height of 30-80 µm.

In an exemplary embodiment of the disclosure, each of the left peak and the right peak has a lateral length of 30-50 µm.

In an exemplary embodiment of the disclosure, the tip of the left peak and the tip of the right peak deviate from the normal of the substrate in an angle of 20-60 degrees.

According to a second aspect of the disclosure, it is provided an optical film comprising the aforementioned microstructure, the optical film comprises a plurality of the microstructures arranged side by side in a lateral direction.

According to a third aspect of the disclosure, it is provided a grating dual view liquid crystal display module, comprising:

a light guide plate having a light source;

a diffusion sheet formed on the light guide plate;

the aforementioned optical film formed on the diffusion sheet; and a liquid crystal display panel having a grating formed on the optical film.

It is to be understood that both the foregoing general description and the following detailed description are exemplary and explanatory only and are not restrictive of the disclosure.

This section provides a general description of various implementations or examples of the techniques described in the disclosure, and is not a full disclosure of the whole scope or all the features of the techniques disclosed.

DESCRIPTION OF ACCOMPANYING DRAWINGS

The above and other objects, features, and advantages of the present disclosure will become more apparent by the detailed description of the exemplary embodiments thereof with reference to the accompanying drawings.

The accompanying drawings, which are incorporated in and constitute a part of this specification, illustrate the embodiments consistent with the present disclosure and, together with the description, serve to explain the principles of the present disclosure.

Apparently, the accompanying drawings in the following description show merely some embodiments of the present disclosure, and a person having ordinary skills in the art may still derive other drawings from these accompanying drawings without creative efforts.

SPECIFIC EMBODIMENTS

Exemplary embodiments will now be described in more details with reference to the accompanying drawings. However, the exemplary embodiments can be implemented in many forms and should not be construed as being limited to the examples set forth herein. The features, structures, or characteristics described may be combined in any suitable manner in one or more embodiments. In the following description, numerous specific details are given to provide a thorough understanding of embodiments of the present disclosure. However, those skilled in the art will recognize that the technical solutions of the present disclosure may be practiced while omitting one or more of the specific details, or other methods, components, devices, steps, etc., may be employed.

It should be noted that, in the accompanying drawings, the size of the layers and regions may be exaggerated for clarity of illustration. It will also be understood that when an element or layer is referred to as being "on" another element or layer, it can be directly on the other element, or an intervening layer may be present. In addition, it will be understood that when an element or layer is referred to as being "under" another element or layer, it can be directly under the other element, or more than one intervening layer or element may be present. In addition, it will also be understood that when a layer or element is referred to as being "between" two elements, it can be the only layer between the two elements, or more than one intervening layer or element may also be present. Throughout the context, similar reference numbers refer to similar elements.

Figure 1:
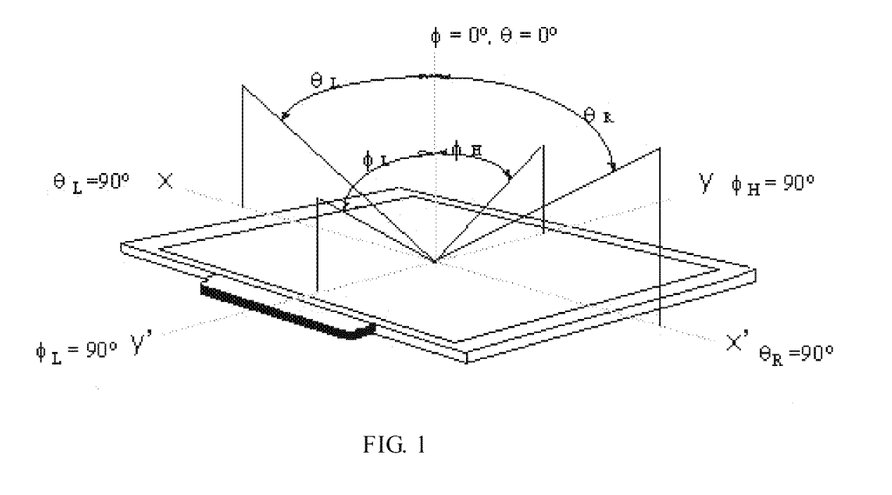
FIG. 1 shows the general definitions of the angles of view for a liquid crystal display module.

Liquid crystal display modules, i.e. LCD modules, are usually used in vehicle displays. When an LCD module is subject to an optical test, the definitions of the angles are usually as shown in FIG. 1. Using the central line perpendicular to the LCD display plane as a reference, the angles mainly in two dimensions are defined, in which on the LCD display plane, XX' is used as the boundary, and $\Phi$ is identified for the angle; $\Phi H$ and $\Phi L$ respectively, represents the angle that can be seen from the upper part and from the lower part on the display screen; moreover, yy' is used as the boundary, and $\theta$ is identified for the angle; $\theta L$ and $\theta R$, respectively, represents the angle that can be seen from the left part and from the right part on the display screen.

Figure 2:
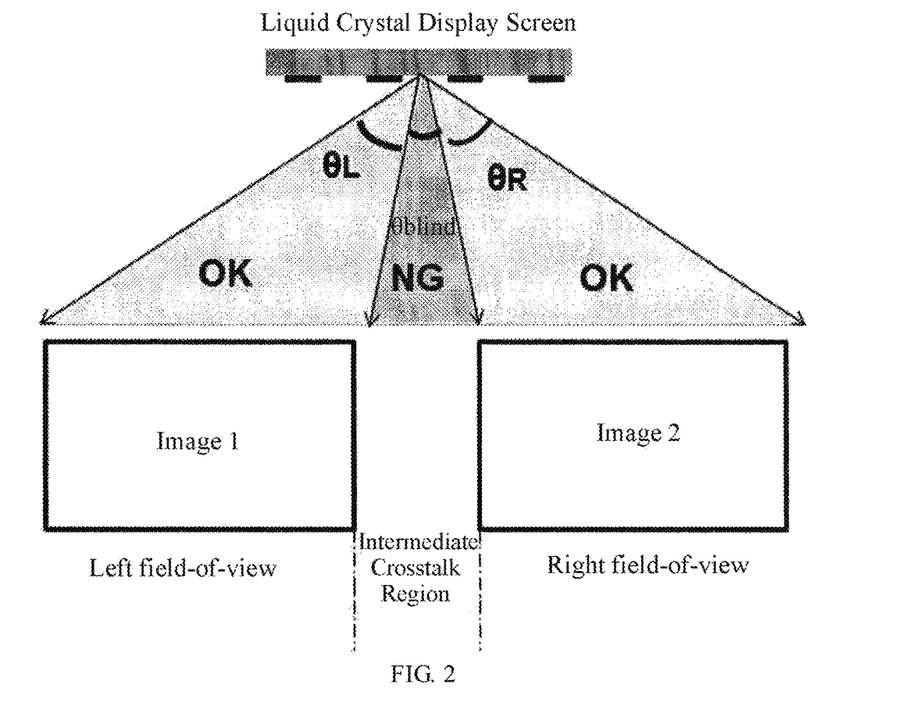
FIG. 2 shows the mechanism of the grating dual view display.

The principle of the grating dual view display used in the vehicle displays, as shown in FIG. 2, is based on that a same liquid crystal display module, i.e., LCD module, displays two different display images in a time-division multiplexing manner for viewing by the main driver and the second driver, respectively. Accordingly, at this point, they are mainly differentiated by the left and right view angles, that is, the parameters of the left and right view angles are identified with the angle $\theta$ as shown in FIG. 1.

Figure 3:
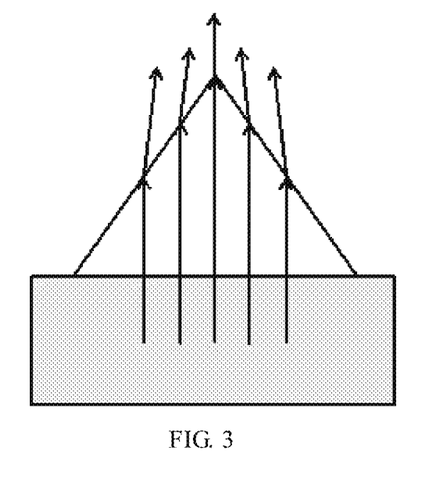
FIG. 3 shows the optical film microstructure unit and the schematic diagram of the optical path for a backlight of a liquid crystal display module according to an exemplary embodiment of the disclosure.
Figure 4A:
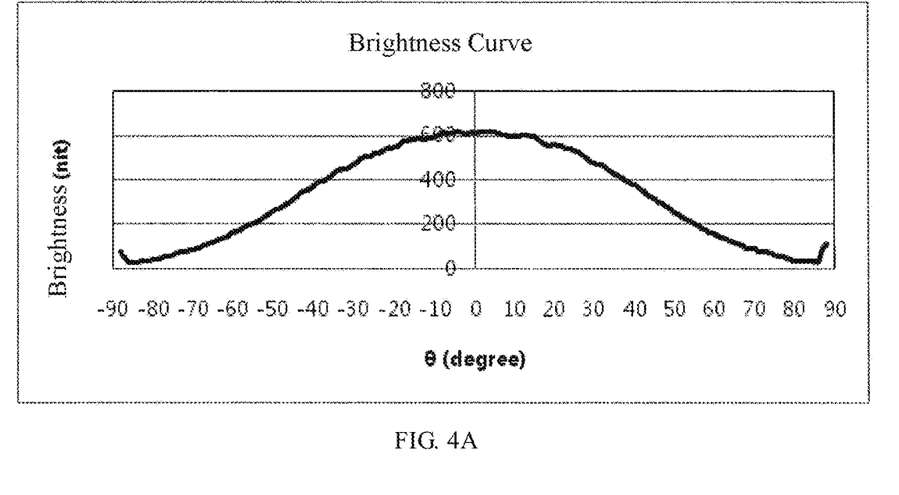
FIG. 4A shows the brightness curve for an optical film according to an exemplary embodiment of the disclosure in a normal single image display.
Figure 4B:
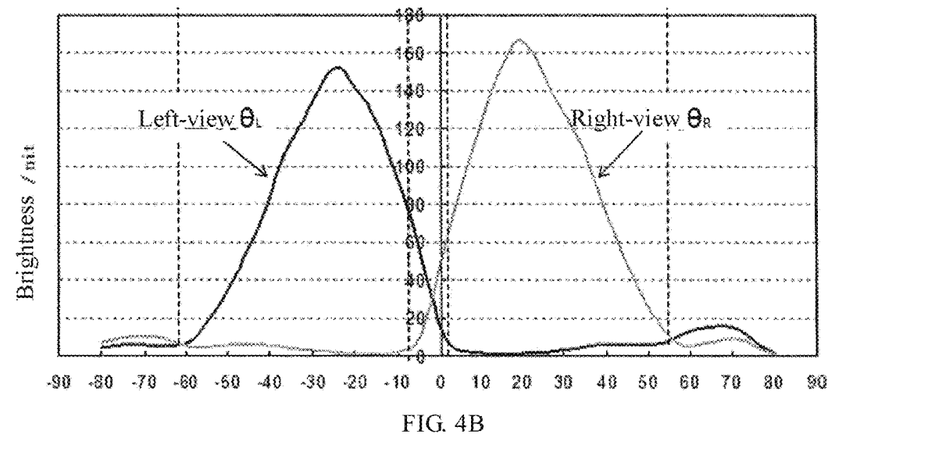
FIG. 4B shows the brightness curve for an optical film according to an exemplary embodiment of the disclosure in a dual view display.

The microstructure of an optical film used in the existing LCD backlight is shown in FIG. 3. The microstructure of the optical film is mainly a mountain ridge structure, whereby the light will converge to the central region to the maximum degree, and then the backlight can maximally exit the light in a direction perpendicular to the substrate, so that the LCD display panel is the brightest at $\theta 0$ and $\Phi 0$. With the existing optical film applied to the LCD module, the brightness distribution with the $\theta$ is shown in FIG. 4A. When $\theta=0$ degree, the brightness value reaches a maximum of 600 nits;

When the existing film is used in a dual view LCD module, as shown in FIG. 4B, the angles that corresponds to the highest brightness is at $\theta L=25°$ (corresponding to −25 degrees at the horizontal axis in FIG. 4A) and at $\theta R=20°$ (corresponding to 20 degrees at the horizontal axis in FIG. 4A), and the highest brightness on both of the left and right sides is lower than 180 nits. That is, when the existing optical film having the mountain ridge microstructure is used in a grating dual view LCD module, the dual view brightness is less than ⅓ of the vertical brightness. At this point, in order to enhance the dual view brightness, it is usually to add a DBEF, i.e., dual brightness enhancement film to achieve the enhancement. However, this will bring two problems: the first is that DBEF is expensive, and the consequent cost is increasing; and the second is that after the addition of a DBEF, the trend of the change of the brightness with the angle is the same as that shown in FIG. 4, and the highest brightness point is still the brightness at $\theta=0$ degree, which means that the highest brightness value is not efficiently utilized. In contrary, in the dual view display, the overlapping interference region centered on the region corresponding to and around $\theta=0$ degree, i.e., the intermediate crosstalk region between image 1 and image 2 has a brightness to be enhanced, thereby making the $\theta$ blind region have such a high brightness that affects the valid display of the left and right views, resulting in a poor dual view effect.

Therefore, the existing optical film microstructure has the following disadvantages:

1. It can only achieve a brightness gain at $\theta=0$ degree, but cannot meet the requirements of the brightness enhancement at different angles for the grating dual view display; and 2. For the existing optical film microstructure, in order to enhance the brightness, it can be achieved only by adding a DBEF which is expensive, but the enhanced brightness makes the brightness of the invalid crosstalk region higher than those of the valid display regions on both of the left and right sides, resulting in not only a high cost but also a poor dual view effect.

The disclosure provides a right-and-left symmetric microstructure for an optical film used in an LCD module backlight, which can satisfy the requirements of a grating dual view LCD module; the microstructure can be designed based on the target values according to the requirements regarding brightness enhancement at different θ angles; the right-and-left symmetric microstructure highlights the optical gain in the valid θL and θR regions and maximally suppresses the brightness of the blind region corresponding to θ=0 so as to achieve a dual view highlighting effect; and the optical film of the disclosure, by virtue of the design of the microstructure, sets the valid brightness-enhancing region on the θL and θR regions, and thus has no invalid highlighted blind region, thereby improving the efficient utilization of the brightness, and achieving a relatively highlighted dual view effect without adding a DBEF.

In particular, the disclosure provides a microstructure for dual view display and an optical film and a liquid crystal display module using the same. The microstructure for dual view comprises: a substrate; and a left peak and a right peak formed on the substrate, wherein the left peak and the right peak exhibit right-and-left symmetry, the tip of the left peak is inclined in a direction away from the tip of the right peak relative to the bottom of the left peak, and the tip of the right peak is inclined in a direction away from the tip of the left peak relative to the bottom of the right peak, the left peak has a reflecting surface on a side of the tip of the left peak which is close to the right peak and a light-emerging surface on a side of the tip of the left peak which is away from the right peak, and the right peak has a reflecting surface on a side of the tip of the right peak which is close to the left peak and a light-emerging surface on a side of the tip of the right peak which is away from the left peak. The light that originally exits from the substrate in an angle of 90 degrees passes through the microstructure and is reflected, and then the emergent light exits in the two main angle ranges as required, thereby achieving enhancement of the brightness of the corresponding backlight at dual view angles.

In the present disclosure, the left peak may be represented by the first peak and the right peak may be represented by the second peak.

Figure 5:
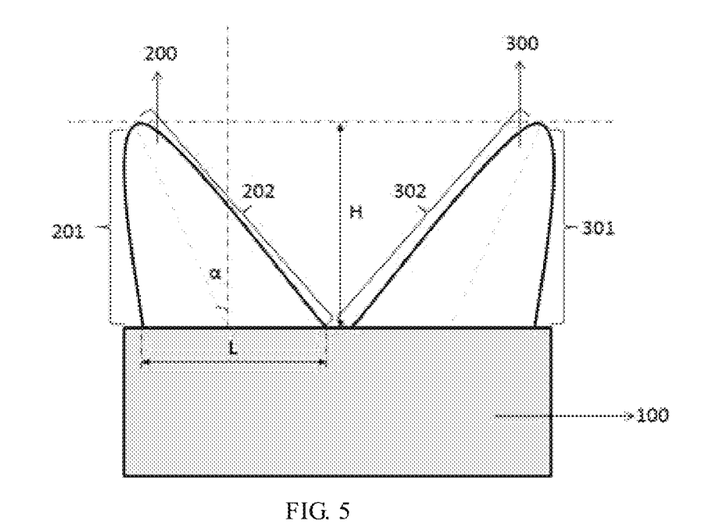
FIG. 5 shows a schematic diagram of a microstructure for dual view display according to an exemplary embodiment of the disclosure.
Figure 6:
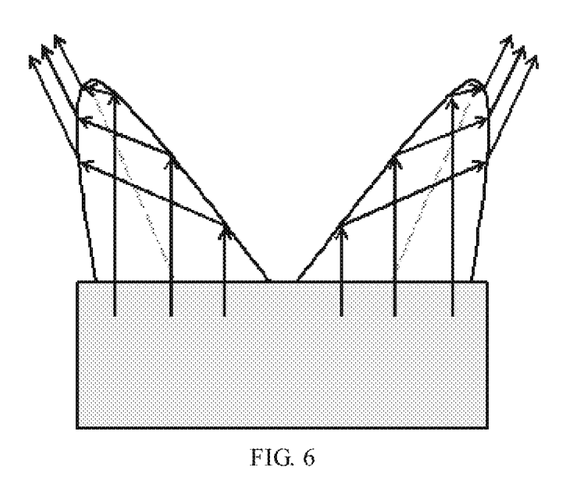
FIG. 6 shows a schematic diagram of the optical path of a microstructure for dual view display according to an exemplary embodiment of the disclosure.
Figure 7:
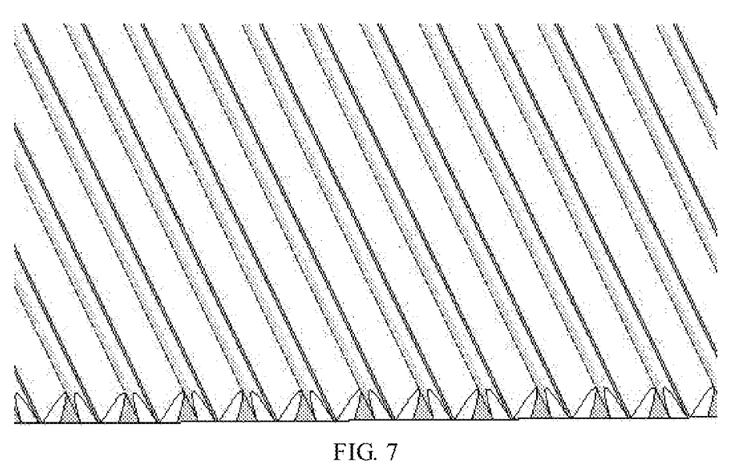
FIG. 7 shows a schematic diagram of an optical film having the microstructure for dual view display as shown in FIG. 5.
Figure 8:
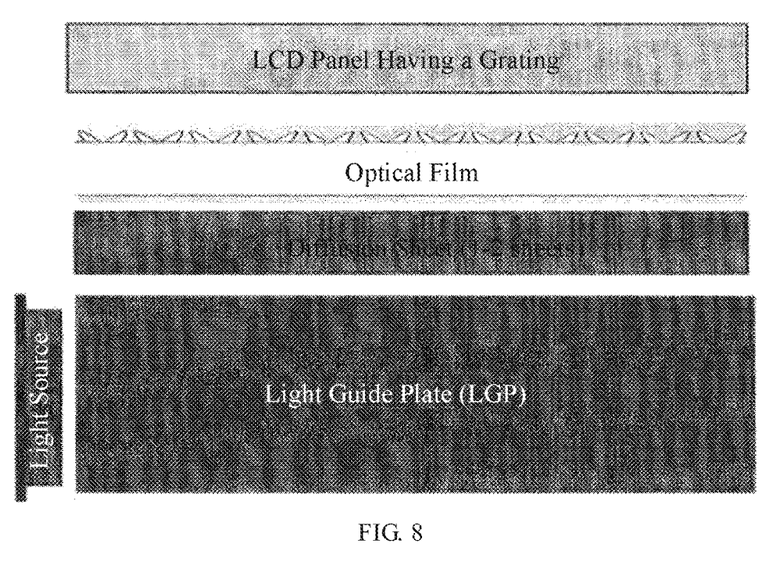
FIG. 8 shows a schematic diagram of a grating dual view liquid crystal display module having the optical film shown in FIG. 7.
Figure 9:
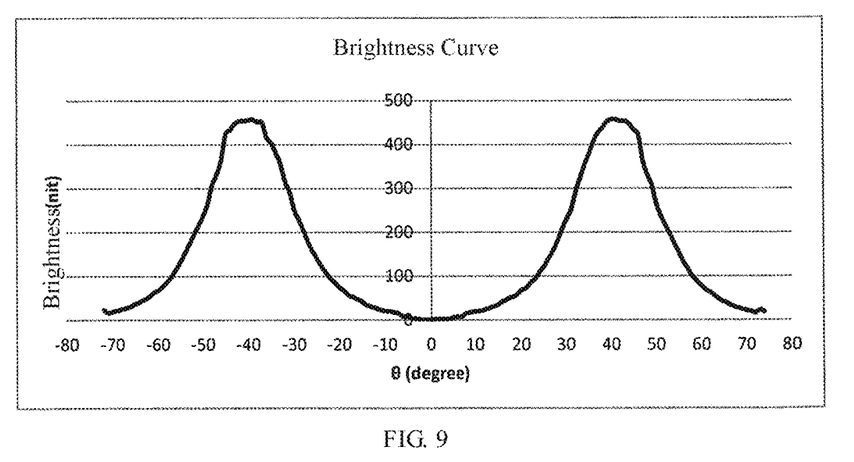
FIG. 9 shows a simulated brightness curve for the grating dual view liquid crystal display module shown in FIG. 8.

The microstructure for dual view display of the present disclosure and the optical film and the liquid crystal display module using the same will be described in detail below with reference to FIGS. 5-9, in which FIG. 5 shows a schematic diagram of a microstructure for dual view display according to an exemplary embodiment of the disclosure, FIG. 6 shows a schematic diagram of the optical path of a microstructure for dual view display according to an exemplary embodiment of the disclosure, FIG. 7 shows a schematic diagram of an optical film having the microstructure for dual view display as shown in FIG. 5, FIG. 8 shows a schematic diagram of a grating dual view liquid crystal display module having the optical film shown in FIG. 7, and FIG. 9 shows a simulated brightness curve for the grating dual view liquid crystal display module shown in FIG. 8.

FIG. 5 shows a schematic diagram of a microstructure for dual view display according to an exemplary embodiment of the disclosure. As shown in FIG. 5, the microstructure mainly comprises three parts: 100 is a substrate, whose material is usually PET, i.e., polyethylene terephthalate, but being not limited thereto; 200 is the left peak of the microstructure, and 300 is the right peak of the microstructure, the left peak 200 and the right peak 300 exhibit right-and-left symmetry, whose material may be PET, i.e., polyethylene terephthalate, Acrylic, or the like, but being not limited thereto; the left peak 200 and the right peak 300 have two different surfaces due to their different coating layers, in which, the surfaces corresponding to 202 and 302 are coated with a reflecting layer, and function to reflect light; and the surfaces corresponding to 201 and 301 are a light-emerging surface. In particular, the tip of the left peak 200 is inclined in a direction away from the tip of the right peak relative to the bottom of the left peak, and the tip of the right peak 300 is inclined in a direction away from the tip of the left peak relative to the bottom of the right peak, the left peak 200 has a reflecting surface 202 on a side of the tip of the left peak which is close to the right peak 300 and a light-emerging surface 201 on a side of the tip of the left peak which is away from the right peak 300, and the right peak 300 has a reflecting surface 302 on a side of the tip of the right peak which is close to the left peak 200 and a light-emerging surface 301 on a side of the tip of the right peak which is away from the left peak 200.

Therein, the thickness α of the substrate, the angles that each of the tip of the left peak and the tip of the right peak deviates from the normal of the substrate, and the height H of the left right and the right peak and the respective lateral lengths L along the substrate of the left right and the right peak may be designed to be different values depending on the needs of practical application, and are not particularly limited. Now, the following is illustrated by taking L=0.03 mm, H=0.03 mm, and α=40° as an example.

The schematic diagram of the optical path corresponding to the microstructure is as shown in FIG. 6. The light from the backlight passes through the substrate (i.e., 100 in FIG. 5) of the optical film and is reflected by the reflecting surfaces (i.e., 202 and 302 in FIG. 5) to the light-emerging surfaces (i.e., 201 and 301 in FIG. 5), and finally refracted in an angle to ensure that the light intensively exits from the light-emerging surface, thereby achieving a utilization efficiency of the light at an effective view angle of about −40° on the left and right sides. Preferably, the angle between the light finally exiting the light-emerging surface and the incident light ranges from 20 to 60 degrees, but is not limited thereto in the disclosure. The angle range may be expanded according to the needs of practical applications, but it cannot be too small in order to avoid the brightness of the intermediate crosstalk region to be enhanced.

According to an embodiment of the disclosure, a parallel light perpendicular to the substrate is incident on the left peak and the right peak, and the parallel light keeps parallel after being reflected by the reflecting surface.

According to an embodiment of the disclosure, a parallel light perpendicular to the substrate is incident on the left peak and the right peak, and the parallel light keeps parallel after exiting from the light-emerging surface.

According to an embodiment of the disclosure, the substrate has a thickness of 150-210 μm.

According to an embodiment of the disclosure, each of the left peak and the right peak has a height of 30-80 μm.

According to an embodiment of the disclosure, each of the left peak and the right peak has a lateral length of 30-50 μm. In the present disclosure, the lateral lengths of the left peak and the right peak refer to the largest lateral length along the substrate, which is L as shown in FIG. 5.

According to an embodiment of the disclosure, the tip of the left peak and the tip of the right peak deviate from the normal of the substrate in an angle of 20-60 degrees. In the present disclosure, the normal of the substrate refers to the line perpendicular to the substrate and passing through the middle point of the left peak or the right peak along the substrate. In the present disclosure, the angle of the tip deviating from the normal refers to an angle between the normal and a straight line passing through the tip and the midpoint, which is a as shown in FIG. 5.

In the disclosure, by virtue of a design of the microstructure unit, the light that originally exits from the substrate in an angle of 90 degrees passes through the microstructure and is reflected, then the emergent light exits in the two main angle ranges as required; and the valid brightness-enhancing region is set on the θL and θR regions and the brightness of the blind region corresponding to θ=0 is suppressed to the maximum degree, thus there is no invalid highlighted blind region, thereby improving the efficient utilization of the brightness, being applicable to the backlight for dual view display in the current vehicles, and achieving enhancement of the brightness of the corresponding backlight at dual view angles.

FIG. 7 shows a schematic diagram of an optical film having the microstructure for dual view display as shown in FIG. 5.

As shown in FIG. 7, the optical film comprises a plurality of the microstructures arranged side by side in a lateral direction. The corresponding substrate thickness may be 150 μm-210 μm, and the height H of the microstructure may be 30-80 μm; the lateral length L along the substrate for each of the left peak and the right peak of the microstructure may be 30-50 μm, that is, the spacing between any two adjacent microstructures is 60-100 μm. However, the thickness a of the substrate, the height H of the microstructure, and the lateral length L along the substrate of each of the left peak and the right peak of the microstructure may be designed to be different values depending on the needs of practical application, and are not particularly limited.

FIG. 8 shows a schematic diagram of a grating dual view liquid crystal display module having the optical film shown in FIG. 7. As shown in FIG. 8, the grating dual view liquid crystal display module comprises: a light guide plate (LGP) having a light source; a diffusion sheet formed on the light guide plate, the number of said diffusion sheet may be 1-2; an optical film as shown in FIG. 7 formed on the diffusion sheet; and a LCD panel, i.e., liquid crystal display panel having a grating formed on the optical film.

FIG. 9 shows a simulated brightness curve for the grating dual view liquid crystal display module shown in FIG. 8.

By performing optical simulation on the grating dual view liquid crystal display module as shown in FIG. 8, the optical brightness curve corresponding to the grating dual view liquid crystal display module is as shown in FIG. 9.

First of all, from the brightness of the intermediate crosstalk region shown in FIG. 9, it can be seen that the grating dual view liquid crystal display module comprising an optical film having the microstructure according to the disclosure substantially has a brightness of 0 nit in the intermediate crosstalk region, the left and right view angles are centered at 40°, and the view angle ranges from 20° to 60°, which not only satisfy the brightness requirements at angels for dual view display, but also suppress maximally the brightness in the intermediate crosstalk region. In contrast, by comparison to the brightness curve for the optical film shown in FIG. 4B in the dual view display, it can be seen that in the dual view display, the overlapping interference region centered on the region corresponding to and around θ=0 degree, i.e., the intermediate crosstalk region between image 1 and image 2 has a brightness to be enhanced, thereby making the θ blind region having such a high brightness that affects the valid display of the left and right views, resulting in a poor dual view effect.

Next, from the brightness of the left and right field-of-view regions shown in FIG. 9, it can be seen that the grating dual view liquid crystal display module comprising an optical film having the microstructure according to the disclosure has a peak brightness of about 460 nit in the left and right field-of-view regions, which is far higher than the peak brightness of about 160 nit of the optical film as shown in FIG. 4B in the dual view display.

To sum up, according to some embodiments of the disclosure, by virtue of the design of the microstructure unit, the light that originally exits from the substrate in an angle of 90 degrees passes through the microstructure and is reflected, then the emergent light exits in the two main angle ranges as required, and the valid brightness-enhancing region is set on the θL and θR regions, and the brightness of the blind region corresponding to θ=0 is suppressed to the maximum degree. Thus, there is no invalid highlighted blind region, thereby improving the efficient utilization of the brightness, being applicable to the backlight for dual view display in the current vehicles, and achieving enhancement of the brightness of the corresponding backlight at dual view angles.

The microstructure for dual view display according to some embodiments of the disclosure and the optical film and the liquid crystal display module using the same achieve enhancement of the brightness of the corresponding backlight at dual view angles by passing the light that originally exits from the substrate in an angle of 90 degrees through the microstructure and reflecting the light, and then exiting the emergent light in the two main angle ranges as required.

Other embodiments of the disclosure will readily occur to those skilled in the art upon consideration of the specification and practice of the disclosure herein. This application is intended to cover any modifications, uses, or adaptations of the disclosure that follow the general principles of the disclosure and include any common general knowledge or conventional technical means in the art which are not disclosed in the disclosure. It is intended that the specification and examples are to be considered as exemplary only, and the true scope and spirit of the disclosure are indicated by the following claims.

It should be understood that the disclosure is not limited to the precise structures that have been described above and shown in the accompanying drawings, and various modifications and changes may be made without departing from the scope thereof. The scope of the present disclosure is only limited by the appended claims.

What is claimed is:

1. A microstructure for a liquid crystal display backlight comprising:
   a substrate; and
   a first peak and a second peak formed on the substrate, wherein:
   the first peak and the second peak exhibit right-and-left symmetry, a tip of the first peak is inclined in a direction away from a tip of the second peak relative to a bottom of the first peak, and the tip of the second peak is inclined in a direction away from the tip of the first peak relative to a bottom of the second peak, the first peak has a reflecting surface which is close to the second peak and a light-emerging surface which is away from the second peak, and the second peak has a reflecting surface which is close to the first peak and a light-emerging surface which is away from the first peak, such that, in response to that a light from the liquid crystal display backlight passes through the substrate, the light from the substrate is reflected by the reflecting surface to the light-emerging surface, and finally refracted in an angle that the light intensively exits from the light-emerging surface, wherein the reflecting surface is formed by coating a reflecting layer such that the light from the substrate does not transmit through the reflecting surface.

2. The microstructure according to claim 1, wherein the light from the substrate is a parallel light perpendicular to the substrate on the first peak and the second peak, and the parallel light keeps parallel after being reflected by the reflecting surface.

3. The microstructure according to claim 2, wherein the parallel light keeps parallel after exiting from the light-emerging surface.

4. The microstructure according to claim 1, wherein the light finally exiting from the light-emerging surface and the light from the substrate have an angle of 20 to 60 degrees.

5. The microstructure according to claim 1, wherein the substrate is made of polyethylene terephthalate.

6. The microstructure according to claim 1, wherein the substrate has a thickness of 150-210 µm.

7. The microstructure according to claim 1, wherein the first peak and the second peak are made of polyethylene terephthalate or acrylic.

8. The microstructure according to claim 1, wherein each of the first peak and the second peak has a height of 30-80 µm.

9. The microstructure according to claim 1, wherein each of the first peak and the second peak has a largest lateral length of 30-50 µm.

10. The microstructure according to claim 1, wherein each of the tip of first peak and the tip of the second peak deviates from the normal of the substrate in a range of 20-60 degrees.

11. An optical film comprising the microstructure according to claim 1, comprises a plurality of the microstructures arranged side by side in a lateral direction along the substrate.

12. A grating dual view liquid crystal display module, comprising:
    a light source;
    a light guide plate;
    a diffusion sheet formed on a light-emerging surface of the light guide plate;
    the optical film according to claim 11 formed on the diffusion sheet; and
    a liquid crystal display panel formed on the optical film.

13. The grating dual view liquid crystal display module according to claim 12, wherein the liquid crystal display panel have a grating.

* * * * *